United States Patent [19]  [11] 3,987,207
Spaeti et al.  [45] Oct. 19, 1976

[54] PROCESS OF PREPARING INSTANTLY DISSOLVING GRANULAR MIX FOR SOUP OF THE POTAGE TYPE

[75] Inventors: Max Spaeti, Tokyo; Yoshihiro Morikawa, Kanagawa; Yasuo Asanuma, Yokohama, all of Japan

[73] Assignee: CPC International Inc., Englewood Cliffs, N.J.

[22] Filed: June 3, 1974

[21] Appl. No.: 475,732

[52] U.S. Cl. .................................. 426/99; 426/285; 426/589; 426/661; 426/456
[51] Int. Cl.² ............................................ A23L 1/40
[58] Field of Search ............ 426/99, 189, 203, 213, 426/302, 363, 285, 291, 307, 589, 661, 456

[56] References Cited
UNITED STATES PATENTS
3,116,151  12/1963  Giddey ....................... 426/203 X
3,582,350  6/1971  Werbin et al. ................ 426/363 X FOREIGN PATENTS OR APPLICATIONS
591,010  1/1960  Canada

OTHER PUBLICATIONS

Lissant, K. J., "Emulsion and Emulsion Technology," Pt. 1, Marcel Dekker Inc., N.Y., 1974, p. 266.

Primary Examiner—A. Louis Monacell
Assistant Examiner—R. A. Yoncoskie
Attorney, Agent, or Firm—John P. Floyd; Salvatore C. Mitri

[57] ABSTRACT

A dry, granular mix for making a potage instantly, i.e., in 1 minute or less, upon the addition of boiling or hot water. The mix granules have sizes in the range 10 mesh to 60 mesh, and are formed from a uniformly constituted mixture of certain pulverized dry potage ingredients that are coated with a fat component, and with a finely-divided dispersion aid distributed between the fat-coated particles. The fat component consists of an edible oil or fat and an oleophilic surfactant having an HLB value of about 6 or less.

3 Claims, No Drawings

PROCESS OF PREPARING INSTANTLY DISSOLVING GRANULAR MIX FOR SOUP OF THE POTAGE TYPE

BACKGROUND OF THE INVENTION

1. Field of the Invention

This invention relates to processes for preparing highly soluble and dispersible granular soup mixes containing starches. These mixes can be prepared to have the flavor of home-made soup. They can be easily prepared and served at the table by adding hot water to the mix, or boiling water. The product is referred to simply as granular potage hereafter.

2. Description of the Prior Art

The art relating to instant soup is highly developed, and many patents have issued that describe attempts to make rapidly soluble soups. For example, Canadian patent No. 591,010, granted Jan. 19, 1960, describes a powdered, precooked soup mix in the form of porous, agglomerated aggregates. U.S. Pat. No. 3,433,650, granted Mar. 18, 1969, teaches the desirability of regulating the particle size of instant soup mix solids, to insure proper hydration and to avoid the formation of lumps. While the teachings of these and other patents are of interest to food technologists, the instant soup products that are available to the public are not all that could be desired.

Powdered soup mixes that are now available on the market must be heated for several minutes with occasional stirring after being dispersed in cold or warm water. Unfortunately, they are apt to form lumps due to poor dispersion and poor hydration.

"Instant" soup mixes recently placed on the market also have the same disadvantage that lumps form and do not dissolve except after the lapse of a considerable time. Further, these products are deficient in taste, probably because the makers put priority on instant solubility. In this regard, they are far inferior to home-made soup.

With the object of removing these disadvantages, the inventors developed instantly dissolving granular potage mixes and processes for preparing them.

SUMMARY OF THE INVENTION

A product prepared in accordance with one preferred embodiment of the invention is a dry, granular mix that is capable of forming a potage within about 60 seconds or less after mixing with boiling or hot water at 75° C (167° F) or above. This mix comprises a free-flowing mixture of granules having sizes in the range from 10 mesh to 60 mesh. The granules are formed from a substantially uniformly constituted mixture of certain of the dry potage ingredients, including at least one pregelatinized material selected from the group consisting of pregelatinized wheat flour, pregelatinized waxy corn starch, and pregelatinized white potato starch, coated with a fatty composition comprising an edible fat or oil and an oleophilic surfactant having an HLB value of about 6 or less, and having finely-divided, dispersion-promoting material distributed between the fat- or oil-smeared particles of the mixture.

Some of the advantageous features of the process involve: the proper selection of certain pregelatinized starches or starch-containing materials as thickeners; the regulation of the particle size of certain of the dry ingredients (other than the dispersion aid(s), which ordinarily is suitable for use directly as purchased commercially) and of the granule size of the mix, for uniformity of distribution of the ingredients and for proper dissolution; the proper physical distribution of the fat component to control the dissolution rate and avoid lumping; the use and proper physical distribution within the granules of a dispersion aid or promoter to facilitate the disintegration and dispersion of the granules; and the use of an oleophilic surfactant having a hydrophilic-lipophilic balance (HLB value) of less than 6.

The process involves several steps, that are described below:

1. Milling the dry ingredients, that are crystalline in nature, to a size below about 80 mesh. The term "crystalline" is not precisely descriptive but is a convenient term. It refers to those ingredients such as, for example, salt, sugar, MSG, and the like.
2. Mixing together the pulverized ingredients.
3. Adding to the mixture of step (2) the other dry ingredients (other than the dispersion aid), including such ingredients, for example, as the pregelatinized material, onion powder, powdered meat extract or the like, and skim milk powder, and mixing all of these together.
4. Mixing the oil or fat component, containing the oleophilic surfactant, with the mixture from step (3), in such a way as to coat the solid particles with the fat or oil component.
5. Adding and mixing in the dispersion aid.
6. Moistening and agglomerating.
7. Drying, screening to the desired 10 to 60 mesh size, and recycling fines and oversize granules.

GENERAL DESCRIPTION OF THE INVENTION

Raw Material Selection

The essential raw materials which give the appropriate viscosity to the potage are starches of different origins, pregelatinized so that they are easily digestible and have good dispersibility and solubility, which are also important requirements for the instant food. Moreover, only certain pregelatinized materials seem to have the combination of characteristics that make them suitable for use in potage mixes in accordance with the present invention. Thus, when pregelatinized corn starch is employed in an attempt to make an instant mix for potage, and that mix is dispersed in boiling water, the pregelatinized corn starch is slow to develop viscosity. Pregelatinized rice flour disperses readily but tends to precipitate, because of its low solubility. Pregelatinized white potato flour also disperses readily, but the potage that is produced tends to have a coarse texture and the taste often is unpleasant to the palate.

As a result of a series of experiments, the inventors have found that pregelatinized wheat flour, pregelatinized waxy corn starch, and pregelatinized white potato starch have the necessary characteristics that are required for use in making up an acceptable dry granular mix for forming a potage product having a good consistency. When these materials are used, the mix produces tasteful soup with a fine texture. These materials have been found to be most effective when more than one of them is used in a single mix, that is, when two or more of them are mixed together for use in preparing a potage mix.

When these pregelatinized materials are employed in the granular mix of the present invention, certain precautions must be taken to obtain proper dispersibility and solubility. These pregelatinized materials, if used without proper precautions, tend to swell abruptly and to gelatinize rapidly, when placed in contact with hot water. The net result of these characteristic occurrences is the formation of lumps as the surfaces of granules first become wetted, then swell, and then become, in effect, surrounded by a coating or a film of gelatinized material. The surface film or coating inhibits the penetration of water into the granules and this in turn prevents dispersion of the material within the granules.

To avoid these unfavorable phenomena, the inventors use a process that results in granules that have unusual properties so that the infiltrating speed of the water into the interior of the granules is greater than the swelling speed of the pregelatinized starch materials, so that dispersing speed of the granules exceeds the swelling and gelatinizing speed of the pregelatinized materials. To this end, an edible fat component is employed that is made of a mixture of an edible vegetable oil or fat and an oleophilic surfactant having HLB value of about 6 or less, and preferably of less than 5. This edible fat component is coated on particles of a mixture of certain of the dry ingredients, by a process earlier adverted to and to be described in more detail presently. These fat- or oil-coated particles are mixed with particles of the dispersion promoter, and the resulting mixture is granulated. The resulting granular structure has the proper balance between dispersibility and solubility, when placed in contact with boiling or hot water.

The dispersion aid or promoter, that is incorporated in the granular structure between the oil- or fat-coated particles, is an edible, water soluble material such as, for example, lactose, dextrin, or syrup solids, or some mixture of one or more of these. The preferred quantity of dispersion aid material for use is from 10 to 30% by weight based on the granules. In addition to furnishing food values, these materials space apart the fat- or oil-coated particles of the pregelatinized material and other dry ingredients in the granules, and in this manner, promote penetration of water into the granules, thus facilitating dispersion and dissolution.

PROCESS OF PREPARATION

The process by which the ingredients are formed into uniform granules is an important part of the invention. Briefly, and generally, the crystalline components are pulverized in a mill. They may be pulverized separately and later mixed, or they may be run through a mill together. The edible oil or fat and the oleophilic surfactant are mixed together, and this forms the fat component. The pregelatinized starch ingredient(s), the fat component, the pulverized dry crystalline ingredients, and other finely-divided particulate ingredients, other than the dispersion aid, are then fed to a mixer which is operated to produce a coating action, so that the fat component is applied to the particles of mixed ingredients to coat them. The dispersion aid is then added to the mixer. The material that is discharged from the mixer is moistened, mixed to form granules, dried, and then screened to the desired 10–60 mesh size range. Fines and oversize particles are recycled.

EXAMPLES

The invention will now be explained in greater detail by describing several specific demonstrations thereof. In the following examples, all parts and percentages are expressed by weight unless otherwise expressly stated.

EXAMPLE I

Instant Corn Potage

The following materials, in the amounts specified, were employed in preparing instant corn potage granules:

| RAW MATERIAL | AMOUNT USED, PARTS BY WEIGHT |
| --- | --- |
| Pregelatinized Corn Flour | 30 |
| Pregelatinized Wheat Flour | 5 |
| Pregelatinized White Potato Starch | 4 |
| Pregelatinized Waxy Corn Starch | 12 |
| Pulverized Sugar (80 mesh) | 8 |
| Pulverized MSG (80 mesh) | 5 |
| Pulverized NaCl (80 mesh) | 8.5 |
| Skim Milk Powder | 7 |
| Onion Powder | 0.5 |
| Hardened Vegetable Oil | 9 |
| Sorbitan Fatty Acid Ester HLB5 | 0.5 |
| Lactose | 10 |

All of the raw materials mentioned above, with the exception of the hardened vegetable oil, the lactose, and sorbitan fatty acid ester, were mixed together in a mixer for two minutes. Then the hardened, melted, vegetable oil, with the sorbitan fatty acid ester dissolved therein, was added to the mixer and mixing was continued for three minutes. Finally, the lactose was added and mixing was continued for another two minutes.

The resulting powder mixture was agglomerated by spraying it with water to a moisture content of about 7 to 11%, tumbling, and then drying the agglomerated material in a current of hot air at 70° C. The dried agglomerates were then screened and the fraction falling in the range between 10 mesh and 60 mesh was retained as product. Fines and oversize particles were recycled to the mixer. The mesh sizes referred to here, and throughout this application, are U.S. Standard Sieves.

The product granules, upon admixture with hot water, dispersed and dissolved in less than 60 seconds, to form a corn potage having excellent taste.

EXAMPLE 2

Cream of Chicken Soup

In this second example of the invention, the following raw materials were employed:

| RAW MATERIAL | AMOUNT USED, PARTS BY WEIGHT |
| --- | --- |
| Pregelatinized Waxy Corn Starch | 21 |
| Pregelatinized Wheat Flour | 13 |
| Pregelatinized Potato Starch | 5 |
| Pulverized NaCl (80 mesh) | 10 |
| Pulverized Sugar (80 mesh) | 5 |
| Pulverized MSG (80 mesh) | 7.5 |
| Chicken Extract, dried powder | 1.5 |
| Hydrolyzed Vegetable Protein (dried powder) | 2 |
| Skim Milk Powder | 15.5 |
| Onion Powder | 1 |
| Spices | 0.2 |
| Chicken Fat | 3 |
| Hardened Vegetable Oil (MP: 38° C) | 7 |
| Dextrin | 11 |
| Dried Parsley Flakes | 0.1 |
| Dried Chicken Meat | 10 |
| Sucrose Fatty Acid Ester HLB2 | 0.5 |

All of the raw materials, except the hardened vegetable oil, the chicken fat, the sorbitan fatty acid ester, the dextrin, parsley, and dried chicken meat, were blended together in a mixer. The hardened (but melted) vegetable oil and chicken fat, containing dissolved therein the sucrose fatty acid ester, was then added, and mixing was continued for a short period of time. Finally, the dextrin was added and mixing was continued for another brief interval. The resulting mixture was then agglomerated by spraying it with water while tumbling. The agglomerates were then dried in a current of hot air, and screened to obtain a product fraction of substantially uniform granules in the size range from 10 mesh to 60 mesh. Fines and oversize particles were recycled to the mixer.

The dried parsley flakes and chicken meat were then mixed with the granules until the mixture was substantially uniform. When this dry potage mix was stirred into hot water in a cup, it exhibited excellent characteristics of dispersibility and solubility. An excellent cream of chicken soup was produced, ready for consumption, in less than 60 seconds. The taste was excellent.

CONCLUSION

The precise amounts of several ingredients can be adjusted within reasonably wide ranges, for control of such factors as thickness, texture, and flavor. For example, for a cream of chicken soup, the pregelatinized materials employed ordinarily should constitute from about 25 to about 45% by weight of the total weight of the granules, and preferably, from about 37 to about 41% by weight. On the other hand, for a corn potage, a substantially higher amount of pregelatinized material can be used. For a corn potage, the amount of pregelatinized material that is employed ordinarily will be determined by tests.

The pregelatinized materials, being soluble, eliminate the need for cooking. They impart food value, mouth feel, and viscosity or body to the potage.

All of the crystalline components should be prepulverized, but not such ingredients as the pregelatinized material, parsley, or the chicken, of which large pieces are desired in the potage. In pulverizing the crystalline components, the particle size should be well below the desired granule size range of 10 mesh to 60 mesh. Ordinarily, particle sizes of 80 mesh or even smaller are preferred.

The edible fat component imparts flavor and fat-containing sensations to the potage. In addition, it is an important factor with respect to its effect on dispersibility and solubility. Ordinarily the fat component will be about 10% by weight of the granules, but obviously, as the examples demonstrate, the amount of fat that is employed can be adjusted over a fairly wide range. That range may extend, for example, from about 5% by weight of the granules to about 15% by weight of the granules, for most of the common varieties of potage.

The oleophilic surfactant ordinarily is dissolved in the fat component, in an amount sufficient to constitute from about 3 to about 5% by weight of the fat component or, on the basis of total granule weight, something less than 0.5% by weight of the granules. While sorbitan fatty acid esters are preferred, provided that the HLB value (hydrophilic-lipophilic balance) is 6 or less, a wide variety of other oleophilic surfactants may be employed. For example, sucrose fatty acid esters and glycerin fatty acid esters can be used in addition to the sorbitan fatty acid esters. Some surfactants, such as fatty acid monoglyceride, having an HLB value of 6, are still effective for the desired purpose. Sugar esters of low HLB value are very effective but are not ordinarily selected for use because they often impart an undesirable odor. Sorbitan fatty acid esters having HLB values below 5 are preferred. Sorbitan esters of saturated fatty acids above $C_{16}$ also work well. Fatty acid monoglycerides of HLB value below 6 are also effective, and those formed from saturated fatty acids above $C_{16}$ are preferred.

In forming the granules, moisture is ordinarily evenly added to the dry mixed ingredients while tumbling, in a quantity so that there is a total moisture content in the range from 7 to 11%. Tumbling is continued to form the moist material into granules. Any drying technique can be used to reduce the moisture content of the agglomerates so that they are no longer tacky.

While the examples have demonstrated the invention in connection with corn potage (cream of corn soup) and cream of chicken soup, it is equally applicable to the production of other kinds of potage, such as, for example, cream of mushroom, cream of vegetable, cream of asparagus, and other cream soups.

While the invention has been described in connection with specific embodiments thereof, it will be understood that it is capable of further modifications, and this application is intended to cover any variations, uses, or adaptations of the invention following, in general, the principles of the invention and including such departures from the present disclosure as come within known and customary practice in the art to which the invention pertains, and as may be applied to the essential features hereinbefore set forth, and as fall within the scope of the invention.

What is claimed is:

1. A dry, granular mix that is capable of forming a potage within less than about one minute upon mixing said granular mix with boiling or hot water, said granular mix comprising a free-flowing mixture of granules having sizes in the range from 10 mesh to 60 mesh, said granules comprising agglomerates of a substantially uniformly constituted mixture of dry potage ingredients including a finely divided, particulate pregelatinized material selected from the group consisting solely of pregelatinized wheat flour, pregelatinized waxy corn starch, pregelatinized white potato starch and mixtures thereof, said dry potage ingredients including particles of pregelatinized material being coated with a fatty composition comprising an edible oil or fat in an amount of about 5–15% by weight of said potage ingredients and said pregelatinized material and an oleophilic surfactant having an HLB value of about 6 or less and present in an amount of about 3–5% by weight of said fatty composition, said oleophilic surfactant being a member selected from the group consisting of sorbitan fatty acid esters, sucrose fatty acid esters, glycerin fatty acid esters, sorbitol esters of saturated fatty acids wherein the fatty acid contains at least 16 carbon atoms, and fatty acid monoglycerides formed from saturated fatty acids wherein the fatty acid contains at least 16 carbon atoms wherein the granules include an edible dispersion aid in finely divided form such as dextrin, lactose, corn syrup solids, and mixtures thereof, distributed between the fat-coated particles.

2. A process for making a dry, granular mix that is capable of forming a potage within less than about 60 seconds upon mixing said granular mix with boiling or hot water, said process comprising: admixing particulate, pulverized dry potage ingredients including a pregelatinized starch material with an edible oil or fat component in an amount of about 5–15% by weight of said potage ingredients and said pregelatinized material and about 3–5% by weight of said edible oil or fat component of an oleophilic surfactant having an HLB value of about 6 or less, such that the fat component adheres to the surfaces of the particles, said pregelatinized starch material being selected from the group consisting solely of pregelatinized wheat flour, pregelatinized waxy corn starch, and pregelatinized white potato starch and said oleophilic surfactant being a member selected from the group consisting of sorbitan fatty acid esters, sucrose fatty acid esters, glycerin fatty acid esters, sorbitol esters of saturated fatty acids wherein the fatty acid contains at least 16 carbon atoms, and fatty acid monoglycerides formed from saturated fatty acids wherein the fatty acid contains at least 16 carbon atoms; mixing with the fat- or oil-coated particles a finely divided dispersion promoting material selected from the group consisting of dextrin, lactose, corn syrup solids, and mixtures thereof; moistening and agglomerating the mixture thus obtained to form agglomerates; and drying and screening the agglomerates to produce granules having sizes in range from 10 mesh to 60 mesh.

3. A process in accordance with claim 2 including the step of recycling any fines and oversize agglomerates into the process.

* * * * *